United States Patent
Zhong et al.

(10) Patent No.: US 8,102,910 B2
(45) Date of Patent: Jan. 24, 2012

(54) RE-ADAPTION OF EQUALIZER PARAMETER TO CENTER A SAMPLE POINT IN A BAUD-RATE CLOCK AND DATA RECOVERY RECEIVER

(75) Inventors: Freeman Y. Zhong, San Ramon, CA (US); Amaresh V. Malipatil, Milpitas, CA (US); Hollis H. Poche, Jr., Sunnyvale, CA (US); Yikui Dong, Cupertino, CA (US); Venkata Naga Jyothi Madhavapeddy, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 653 days.

(21) Appl. No.: 12/240,046

(22) Filed: Sep. 29, 2008

(65) Prior Publication Data

US 2010/0080282 A1 Apr. 1, 2010

(51) Int. Cl.
*H04L 27/01* (2006.01)
(52) U.S. Cl. ........ 375/233; 375/229; 375/230; 375/231; 375/232; 375/234; 375/348
(58) Field of Classification Search .................. 375/232, 375/233, 348, 229, 230, 231, 234; 333/18, 333/28; 708/300, 319, 323, 819
See application file for complete search history.

(56) References Cited

U.S. PATENT DOCUMENTS

| | | | |
|---|---|---|---|
| 2003/0095592 A1* | 5/2003 | Bergmans et al. | 375/232 |
| 2005/0157780 A1* | 7/2005 | Werner et al. | 375/232 |
| 2006/0146926 A1* | 7/2006 | Bhoja et al. | 375/233 |

* cited by examiner

*Primary Examiner* — Dhaval Patel
(74) *Attorney, Agent, or Firm* — Christopher P. Maiorana, PC (57) ABSTRACT

An apparatus generally having a first circuit and a second circuit. The first circuit may be configured to (i) generate an equalizer parameter in response to an input signal, the equalizer parameter causing a cancellation of post-cursor inter-symbol interference from a plurality of symbols in the input signal and (ii) generate an output signal in response to both the input signal and the equalizer parameter. The second circuit may be configured to (i) generate a target parameter signal in response to the input signal, the target parameter signal representing a mean value of a plurality of sample points of the symbols and (ii) generate a control signal in response to the target parameter signal, the control signal causing a reduction of the equalizer parameter, the reduction causing a decrease in the cancellation of the post-cursor inter-symbol interference from the symbols, wherein the apparatus does not cancel pre-cursor inter-symbol interference.

16 Claims, 8 Drawing Sheets

(CONVENTIONAL)

FIG. 1

(CONVENTIONAL)

RE-ADAPTION OF EQUALIZER PARAMETER TO CENTER A SAMPLE POINT IN A BAUD-RATE CLOCK AND DATA RECOVERY RECEIVER

FIELD OF THE INVENTION

The present invention relates to receivers of digital communications generally and, more particularly, to a method and/or apparatus for re-adaptation of an equalizer parameter to center a sample point in a baud-rate clock and data recovery receiver.

BACKGROUND OF THE INVENTION

Clock and Data Recovery (CDR) circuits form a part of Serial-Deserial (SerDes) receivers. The CDR circuits track the phase of a sampling clock based on some criterion, such as minimizing a Mean-Squared-Error (MSE). Conventional CDR circuits are commonly designed to achieve low target bit-error-ratios (BER) on the order of $10^{-12}$ to $10^{-15}$ errors per bit. The CDR circuits commonly used in practice can be broadly classified into two categories, baud-rate CDR and bang-bang CDR. Each class has associated advantages and disadvantages.

In a bang-bang, or Alexander type CDR, a received signal is sampled twice each symbol period. The symbol period is called a Unit Interval (UI). Ideally, one sample is obtained at a crossing boundary and another sample is obtained at a center of a slicer input "eye". Two consecutive "center" data samples (i.e., d[k-1] and d[k]) and the crossing sample in-between (i.e., p[k]) are used to decide whether the current sampling phase is lagging or leading. The sampling phase is then corrected accordingly. In a bang-bang CDR, the eye looks symmetric about the sampling point, which is desirable for good sinusoidal jitter tolerance. However, better jitter tolerance comes at the cost of oversampling the signal. The oversampling adds cost and complexity to the system.

In a baud-rate CDR, the received signal is sampled at the baud rate or once every UI. Hence, oversampling does not occur in the baud-rate CDRs. The sampling phase can be chosen based on different criteria. For example, in an MSE baud-rate CDR, the sampling phase that yields a minimum MSE is chosen. In a Mueller-Muller baud-rate CDR, the sampling phase is chosen such that a first pre-cursor and a first post-cursor of an equalized pulse about the sampling point are equal. Thus, the sampling point chosen may not be in the center of the equalized eye if the equalized pulse is not symmetrical in terms of first pre-cursor and first post-cursor.

Figure 1:
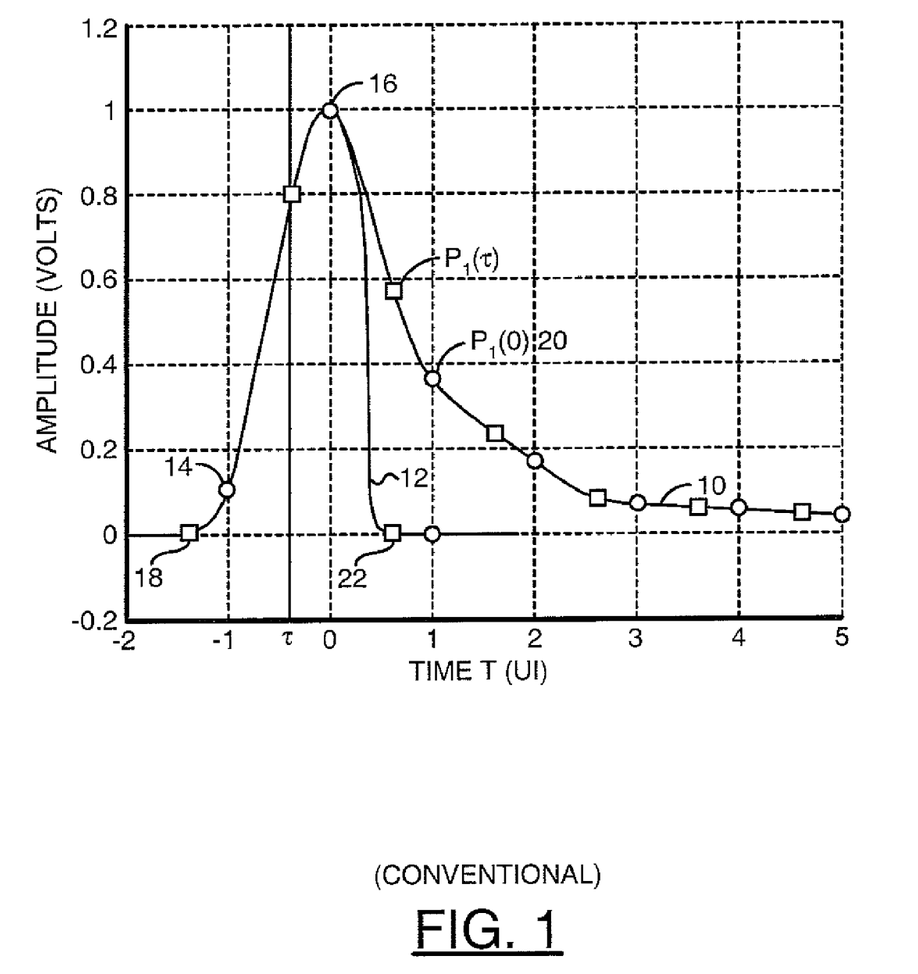
FIG. 1 is a diagram of a conventional pulse responses.

Referring to FIG. 1, a diagram of a conventional unequalized pulse response 10 and a conventional equalized pulse response 12 is shown. Consider a baud-rate CDR where a convergence point (i.e., settling point) relies on a pre-cursor matching a post-cursor. In the absence of a Receive Feed-Forward Equalizer (Rx-FFE), or if a transmit Finite Impulse Response (FIR) filter does not properly cancel the pre-cursor, a residual pre-cursor sample 14 (i.e., $p_{-1}(0)$) has a major impact on the settling point $\tau$ of a Mueller-Muller baud-rate CDR. The residual pre-cursor sample 14 causes the Mueller-Muller baud-rate CDR to shift the sampling phase to the left of the peak (ideally the unequalized sample 16 at time=0) so that a first pre-cursor 18 (i.e., $p^e_{-1}(\tau)$), with respect to the sampling point, is close to zero amplitude. Accordingly, the magnitude of the first post-cursor 20 (i.e., $p_{+1}(0)$) in the unequalized pulse response 10 increases from $p_{+1}(0)$ to $p_{+1}(\tau)$ because of the shifting left.

Figure 2:
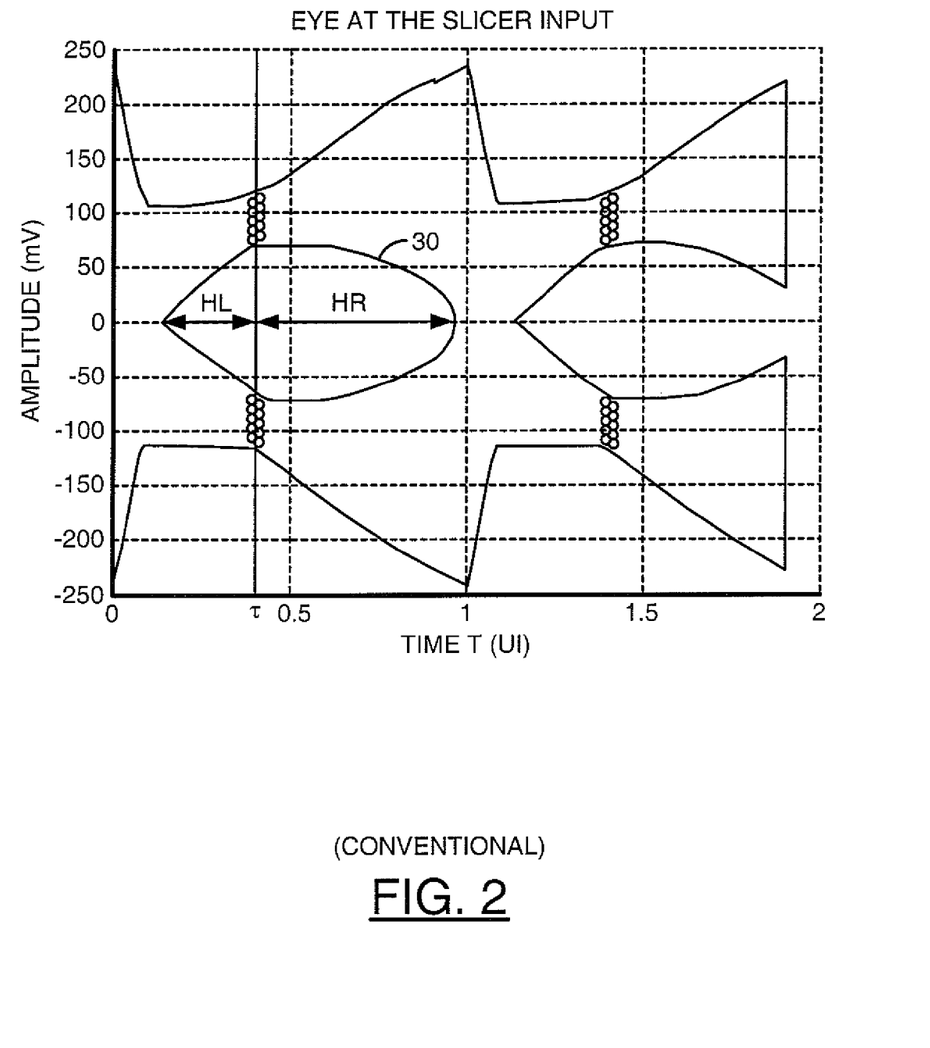
FIG. 2 is a diagram of a conventional slicer input eye of a Decision-Feedback Equalizer receiver with un-cancelled pre-cursor Inter-Symbol Interference.

Referring to FIG. 2, a diagram of a conventional slicer input eye 30 of a Decision-Feedback Equalizer (DFE) receiver with un-cancelled pre-cursor Inter-Symbol Interference (ISI) is shown. The DFE can cancel the post-cursor ISI in the unequalized pulse 10. The resulting equalized pulse 12 has the first pre-cursor 18 (i.e., $p^e_{-1}(\tau)=0$) and a first equalized post-cursor sample 22 (i.e., $p^e_{+1}(\tau)=0$) near the zero amplitude, where the superscript "e" denotes an equalized sample. Hence, the equalized eye 30 of the slicer is asymmetric about the sampling point $\tau$. Particularly, a left horizontal eye opening (i.e., HL) is smaller than a right horizontal eye opening (i.e., HR). Therefore, a Sinusoidal Jitter Tolerance (SJT), which is the amplitude of sinusoidal jitter about the sampling point that can be tolerated without errors (i.e., 2*HL), is reduced compared with the ideal sample point at time=0. Thus, in optical applications where a transmitter FIR filter is not available, the Mueller-Muller baud-rate CDR suffers from poor SJT compared with the bang-bang CDR.

SUMMARY OF THE INVENTION

The present invention concerns an apparatus having a first circuit and a second circuit. The first circuit may be configured to (i) generate an equalizer parameter in response to an input signal, the equalizer parameter causing a cancellation of post-cursor inter-symbol interference from a plurality of symbols in the input signal and (ii) generate an output signal in response to both the input signal and the equalizer parameter. The second circuit may be configured to (i) generate a target parameter signal in response to the input signal, the target parameter signal representing a mean value of a plurality of sample points of the symbols and (ii) generate a control signal in response to the target parameter signal, the control signal causing a reduction of the equalizer parameter, the reduction causing a decrease in the cancellation of the post-cursor inter-symbol interference from the symbols, wherein the apparatus does not cancel pre-cursor inter-symbol interference.

The objects, features and advantages of the present invention include providing a method and/or apparatus for re-adaption of an equalizer parameter to center a sample point in a baud-rate Clock and Data Recovery (CDR) receiver that may (i) center a sample point in a decision-feedback equalized eye of a receiver employing a baud-rate CDR in the absence of a feed-forward equalization, (ii) provide an improved sinusoidal jitter tolerance compared with conventional Mueller-Muller baud-rate CDRs and/or (iii) adapt a first tap in an adjustable decision-feedback equalizer.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 3:
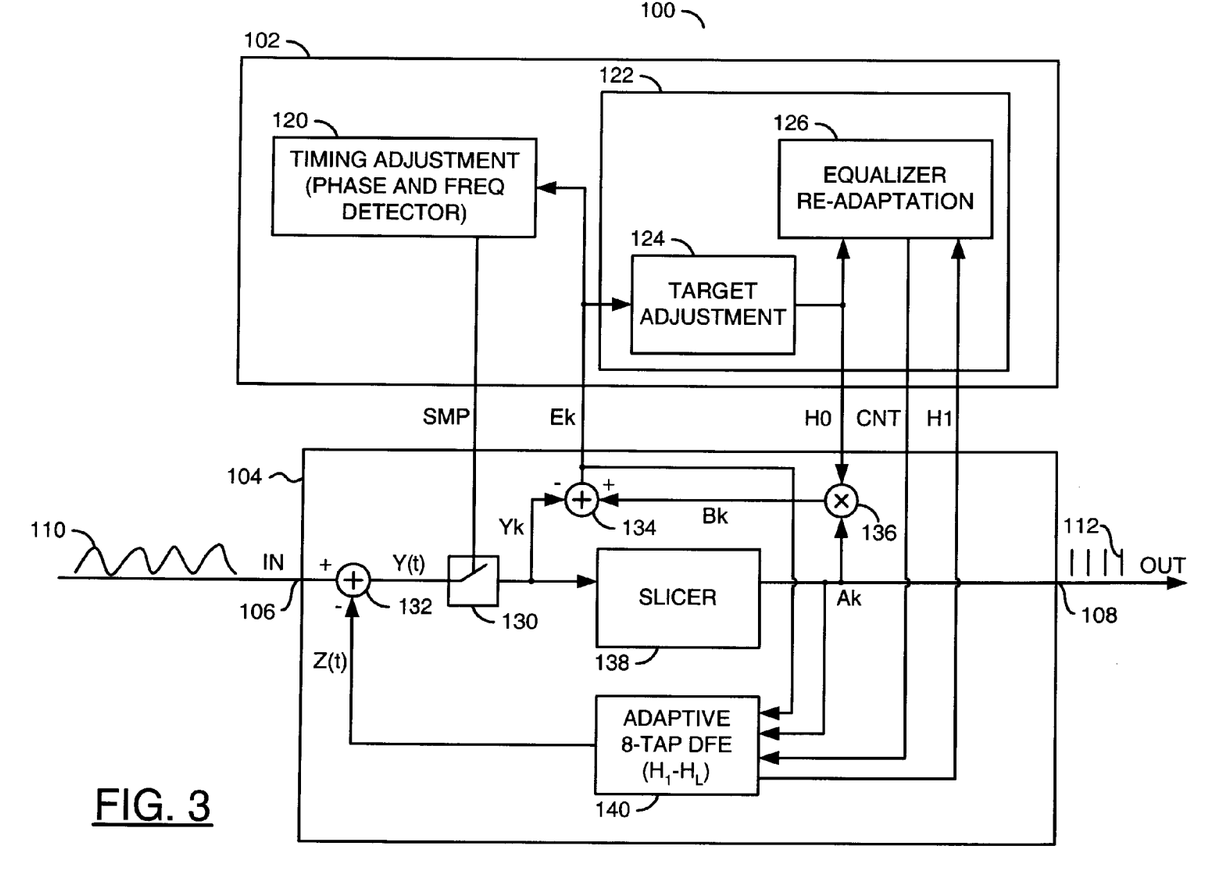
FIG. 3 is a block diagram of a receiver in accordance with a preferred embodiment of the present invention.

Referring to FIG. 3, a block diagram of a receiver 100 is shown in accordance with a preferred embodiment of the present invention. The receiver (apparatus or system) 100 is generally operational to center a sample point in a decision-feedback equalized eye where the receiver employs a baud-rate Clock and Data Recovery (CDR) circuit. The receiver 100 generally comprises a circuit (or module) 102 and a circuit (or module) 104. The receiver 100 may lack a Feed-Forward Equalization (FFE) capability.

A signal (e.g., IN) may be received at an interface 106 of the circuit 104. A signal (e.g., OUT) may be generated by the circuit 104 and presented at an interface 108. The circuit 104 may generate and present a signal (e.g., Ek) to the circuit 102 and use the signal Ek internally. A signal (e.g., SMP) may be generated by the circuit 102 and presented to the circuit 104. A signal (e.g., H0) may also be generated by the circuit 102 and presented back to the circuit 104. The circuit 102 may generate and present a signal (e.g., CNT) to the circuit 104. A signal (e.g., H1) may be generated by the circuit 104 and presented to the circuit 102.

The signal IN may comprise an analog signal carrying a sequence of pulses 110. Each of the pulses 110 may represent a symbol that has been subjected to pre-cursor Inter-Symbol Interference (ISI) and post-cursor ISI. The symbols generally represent clock information and/or data information.

The signal OUT may comprise a digital signal carrying a sequence of values 112. Each one of the values 112 may correspond to a respective one of the symbols 110. The amplitudes of the values 112 generally correspond to a sampled value of the equalized signal at or near the ideal sampling point (e.g., time=0).

The signal SMP may implement a sample command. When the signal SMP is asserted, the circuit 104 may take a sample (e.g., digitize) of the equalized signal Y(t).

The signal Ek may implement an error signal. The signal Ek generally indicates an amplitude and direction of a deviation between the actual sample points and the ideal sample points.

The signal H0 may implements a gain parameter and/or a target parameter signal. The signal H0 generally denotes a mean value of the signal at the sampling points. The value of the signal H0 generally depends on multiple sampling points.

The signal H1 may implement a tap signal. The signal H1 generally identifies a tap weight of a first tap in an adaptive decision-feedback equalizer.

The signal CNT may implement a control signal. The signal CNT generally commands the circuit 104 to adaptively adjust an equalization parameter (e.g., the tap weight of a first tap $H_1$). The adjustments may cause the sampling points to shift right toward a center of a slicer input eye.

The circuit 102 may implement an adaptation equalization control circuit. The circuit 102 is generally operational to (i) control the sampling point phase of the signal IN, (ii) adjust the target value and (iii) readapt the equalization. The control may be based on the signal Ek.

The circuit 104 may implement a sampling circuit. The circuit 104 is generally operational to (i) sample the signal Y(t), (ii) generate the signal Ek, (iii) equalize the samples and (iv) generate the signal OUT. The equalization and adaptation may be based on the signal Ak, the signal Ek and the signal CNT.

The circuit 102 generally comprises a circuit (or module) 120 and a circuit (or module) 122. The circuit 122 generally comprises a circuit (or module) 124 and a circuit (or module) 126 The signal Ek may be received by the circuit 120 and the circuit 124. The circuit 120 may generate the signal SMP. The circuit 124 may generate the signal H0. The circuit 126 may generate the signal CNT. The signal H1 may be received by the circuit 126.

The circuit 120 may implement a timing adjustment circuit. The circuit 120 is generally operational to perform a phase and frequency detection and adjust a phase of the signal SMP based on the signal Ek. The circuit 120 may be implemented similar to a phase adjustment circuit in a common Mueller-Muller baud-rate CDR.

The circuit 124 may implement a target adjustment circuit. The circuit 124 is generally operational to generate the signal H0 based on the signal Ek. The adjustment generally changes a post-cursor inter-symbol interference cancellation such that the sampling point shifts right toward the center of the slicer input eye.

The circuit 126 may implement an equalizer re-adaption circuit. The circuit 126 may be operational to generate the signal CNT based on the signal H0 and the signal H1. Further details of the operation are provided below.

The circuit 104 generally comprises a circuit (or module) 130, a circuit (or module) 132, a circuit (or module) 134, a circuit (or module) 136, a circuit (or module) 138 and a circuit (or module) 140. The circuit 132 may receive the signal IN from the interface 106 and the signal SMP from the circuit 120. The 134 may generate and present the signal Ek to the circuit 102 and the circuit 140. The circuit 136 may receive the signal H0 from the circuit 124. The circuit 138 may sample an equalized signal and generate and present the signal OUT to the interface 108, the circuit 136 and the circuit 140. The circuit 140 may receive the signal CNT, the signal OUT and the signal Ek. The signal Hi may be presented from the circuit 140 to the circuit 126 for re-adaptation.

The circuit 132 may generate and present a signal (e.g., Y(t)) to the circuit 134. The circuit 130 may receive the signal SMP and the signal Y(t). A signal (e.g., Yk) may be generated by the circuit 130 and presented to the circuits 134 and 138. A signal (e.g., Bk) may be generated by the circuit 136 and presented to the circuit 134. A signal (e.g., Z(t)) may be generated by the circuit 140 and presented to the circuit 132. The signal OUT may also be illustrated in the figure as a signal (e.g., Ak).

The circuit 130 may implement an analog-to-digital circuit. The circuit 130 is generally operational to digitize the signal Y(t) to create the signal Yk. Digitization may be controlled by the signal SMP. The signal Yk generally comprises a sequence of digital values, one per sample. Each of the digital values may represent an equalized amplitude of the signal IN when sampled. In some embodiments, the circuit 130 may be inside the circuit 138.

The circuit 132 may implement a summation circuit. The circuit 132 is generally operational to sum the received signal IN with the signal Z(t) to generate the signal Y(t).

The circuit 134 may implement another summation circuit. The circuit 134 is generally operational to sum the signal Bk with the equalized signal Yk to generate the signal Ek.

The circuit 136 may implement a multiplication circuit. The circuit 136 is generally operational to calculate digital values in the signal Bk by multiplying the digital values in the signal Ak (the signal OUT) with the target parameter value in the signal H0.

The circuit 138 may be implemented as a slicer circuit. The circuit 138 may be operational to sample the signal Yk to generate the signal Ak (the signal OUT).

The circuit 140 may implement an L-tap adaptive decision-feedback equalizer circuit. The circuit 140 may be operational to generate the signal Z(t) as a weighted sum of one or more previous values received in the signal Ak. The circuit 140 generally implements multiple taps (e.g., $H_1$ to $H_L$). The tap weight of a first tap $H_1$ may be controlled by the signal CNT and signed element adaptations. The signal H1 may convey the tap weight of the first tap $H_1$. In the absence of any feed-forward equalization, the circuit 140 and the circuit 132 may cause adjustable cancellation of post-cursor ISI from the values in the signal IN.

Adjustment of the weight of the first tap $H_1$ in the circuit 140 generally allows some residual first post-cursor ISI to be un-cancelled. The un-cancellation is controlled such that the first post-cursor ISI generally matches the first pre-cursor ISI (with respect to the peak of the pulse response). Matching the ISIs may cause the baud-rate CDR to sample the pulse response at or near the pulse response peak and generally makes the equalized pulse symmetrical. In some embodiments, the other taps in the circuit 140 may be adjusted as well.

Figure 4:
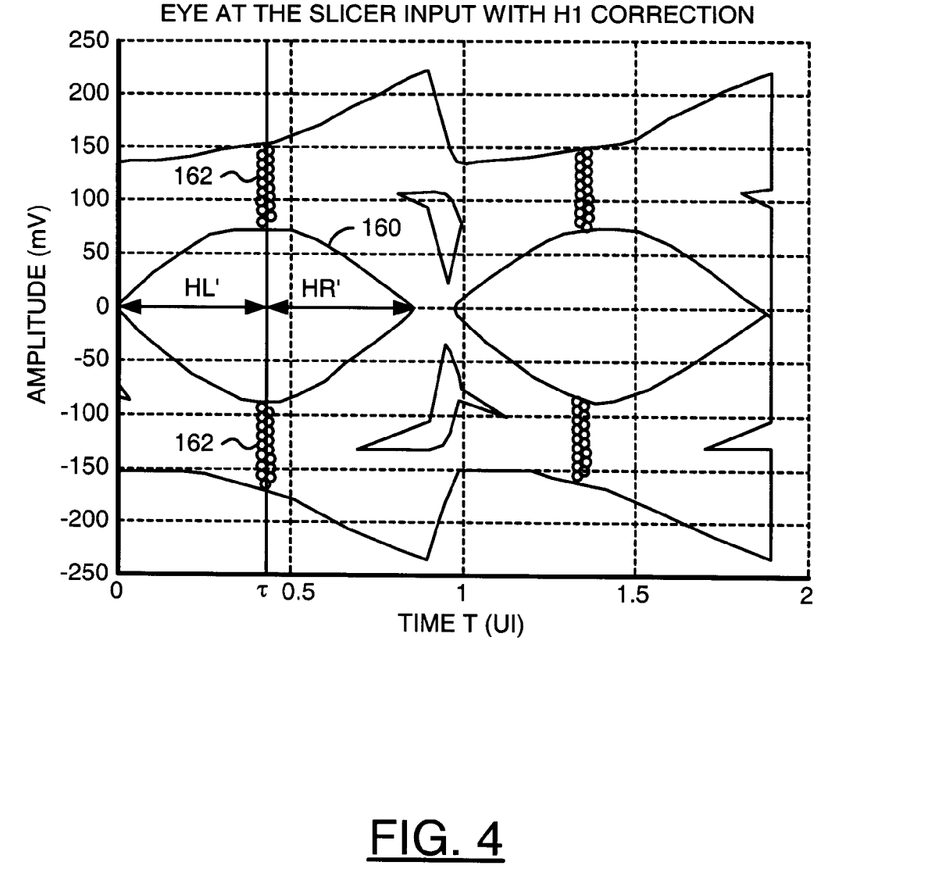
FIG. 4 is a diagram of a symmetrical eye resulting from equalization re-adaptation.

Referring to FIG. 4, a diagram of a symmetrical eye 160 resulting from the equalization re-adaptation is shown. By allowing some residual first post-cursor ISI, sample point τ may be more centered in the eye 160. In particular, the left horizontal eye opening (e.g., HL') may be approximately the same as the right horizontal eye opening (e.g., HR'). As such, the improved symmetrical horizontal eye opening (HL'=HR') generally increases the tolerable sinusoidal jitter (e.g., 2*HL'>2*HL).

Figure 5:
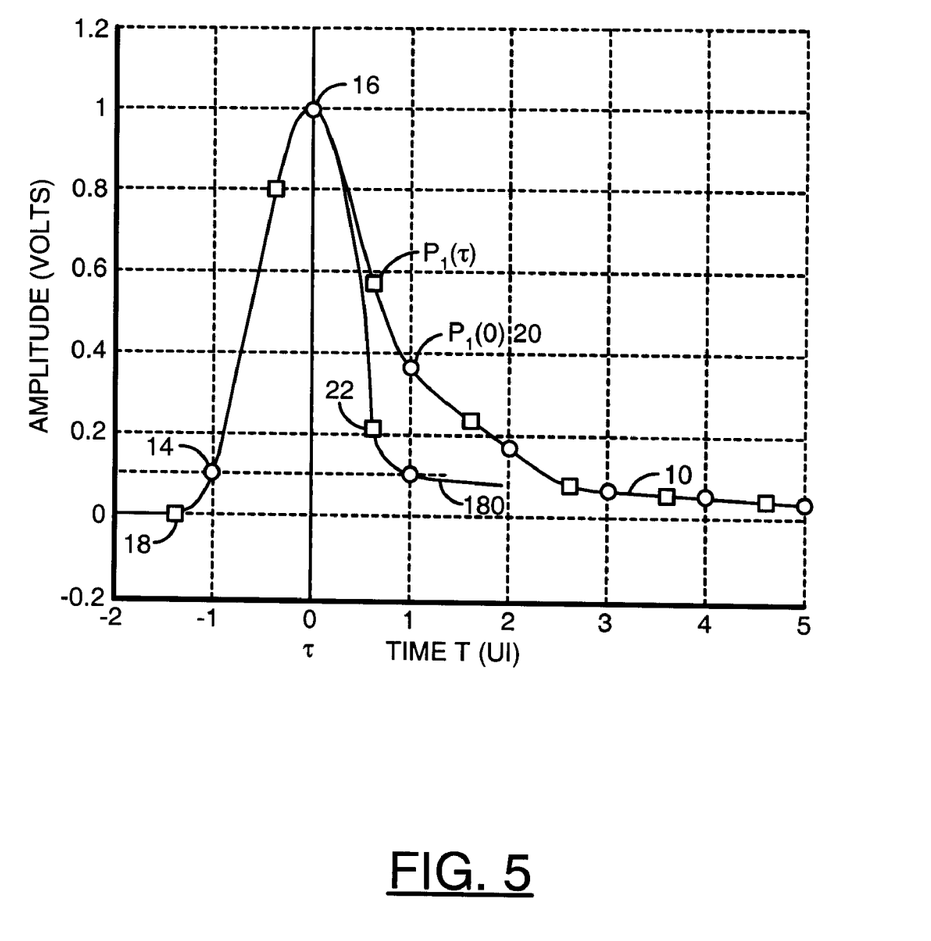
FIG. 5 is a diagram of the example unequalized pulse response and a re-adapted equalized pulse response.

Referring to FIG. 5, a diagram of the example unequalized pulse response 10 and a re-adapted equalized pulse response 180 is shown. In the presence of the unequalized residual pre-cursor sample 14 the baud rate CDR generally settles such that the resulting equalized first pre-cursor 18 has a zero amplitude. The mean value of the signal IN at the sampling point τ may be denoted as $h_0$. In FIG. 4, the mean value generally corresponds to the mean signal level of the dots (regions 162), which are the sampled values. The gain value $h_0$ may also be adapted using a sign-sign LMS to track the signal level at the sampling point τ. As such, the value $h_0$ generally depends on the sampling point τ. As the sampling point τ moves toward the right, the value $h_0$ should increase. The value $h_0$ generally hits a plateau when the sampling point τ is close to the center of the eye 160.

The CDR may be forced to move the sampling point τ to the right in FIG. 5 by reducing the $H_1$ tap weight in steps, allowing the timing to shift right and the value $h_0$ to adapt to a new voltage level. By reducing the $H_1$ tap weight (e.g., moving the first post-cursor sample down from $p_1(\tau)$), some residual post-cursor ISI may be left in the equalized response 180. By the property of the Mueller-Muller CDR, the new sampling phase is chosen such that the equalized first pre-cursor (with respect to the new sampling phase) matches the residual first post-cursor. Thus, the sampling phase may to move closer to time=0, and the resulting eye is therefore more symmetrical, as show in FIG. 4.

Figure 6:
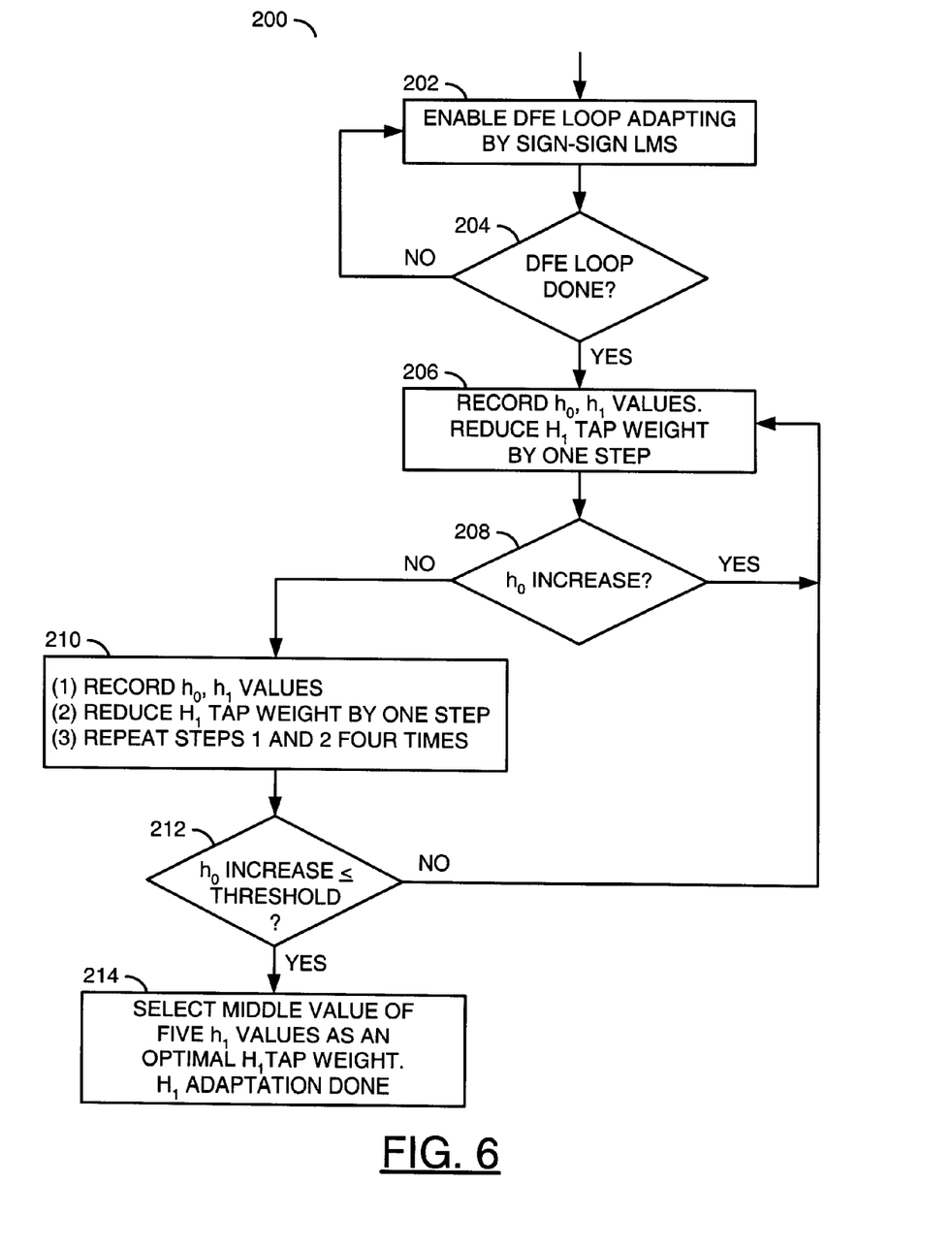
FIG. 6 is a flow diagram of an example method implementing the re-adaptation.

Referring to FIG. 6, a flow diagram of an example method 200 implementing the re-adaptation is shown. The method (or process) 200 may be implemented by the receiver 100. The method 200 generally comprises a step (or block) 202, a step (or block) 204, a step (or block) 206, a step (or block) 208, a step (or block) 210, a step (or block) 212 and a step (or block) 214.

Experimental measurements generally reveal that the value $h_0$ may increase rapidly at first, then increase softly as the $H_1$ tap weight is reduced from the usual adapted value (e.g., as determined by a sign-sign LMS adaptation technique). The measurements also show that a first corner in the soft-increase region generally corresponds to an optimal $H_1$ weight setting. The first soft-increase corner is where an index of the value $h_0$ changes at most by a first number of setting (e.g., a threshold of 2) when an index of the value $h_1$ reduces by a second number of setting (e.g., 5). An odd number of samples (e.g., 3) may to be taken for each sample point to enable a majority voting to determine the change of the value $h_0$ and the resulting programmability of the soft-increase corner.

In the step 202, the receiver 100 may enable a Decision-Feedback Equalization (DFE) loop adapting of the tap weights of the $H_1$ to $H_L$ taps. In some embodiments, the circuit 140 may use a sign-sign least-mean-square technique. Other techniques may be used to meet the criteria of a particular application. In the step 204, a check is made to determine if the DFE loop has settled. If the DFE loop is not settled (e.g., the NO branch of step 204), the receiver 100 may continue the adaptation of the $H_1$ to $H_L$ taps.

Once the DFE loop has settled (e.g., the YES branch of step 204), the initial index values of $h_0$ and $h_1$ may be recorded by the circuit 126 (e.g., $h_0[0]$ and $h_1[0]$). In the step 206, the circuit 126 may command the circuit 140 to reduce the $H_1$ tap weight by a single step (or weight unit). The circuit 126 may determine in the step 208 if the value $h_0$ actually increased due to the $H_1$ tap weight shift. If the value $h_0$ did increase (e.g., the YES branch of step 208), the circuit 126 may update the initial values of $h_0$ and $h_1$ and command the circuit 140 to decrease the $H_1$ tap weight an additional step.

Once the value $h_0$ has not increased (e.g., the NO branch of step 208), the circuit 126 may record the resulting values of $h_0$ and $h_1$ (e.g., $h_0[1]$ and $h_1[1]$) in the step 210. Furthermore, the circuit 126 may command several (e.g., four) subsequent reductions in the $H_1$ tap weight and record the resulting values of $h_0$ and $h_1$ (e.g., $h_0[2]$, $h_0[3]$, $h_0[4]$, $h_0[5]$, $h_1[2]$, $h_1[3]$, $h_1[4]$ and $h_1[5]$) in the step 210. Changes in the index values from $h_0[1]$ to $h_0[5]$ may be checked by the circuit 126 to determine if a soft-increase corner has been reached in the step 212. If no soft-increase corner has been detected (e.g., the NO branch of step 212), the method 200 may return to the step 206 where the current values of $h_0$ and $h_1$ are recorded and the $H_1$ tap weight is reduced by another step.

If a soft-increase corner has been detected (e.g., the YES branch of step 212), the circuit 126 may identify a median (middle) index value among the $h_0$ index values and establish the corresponding $H_1$ tap weight as an optimum setting in the step 214. As such, the adaptation may be complete and the future samples may be made based on the last value in the signal CNT.

Figure 7:
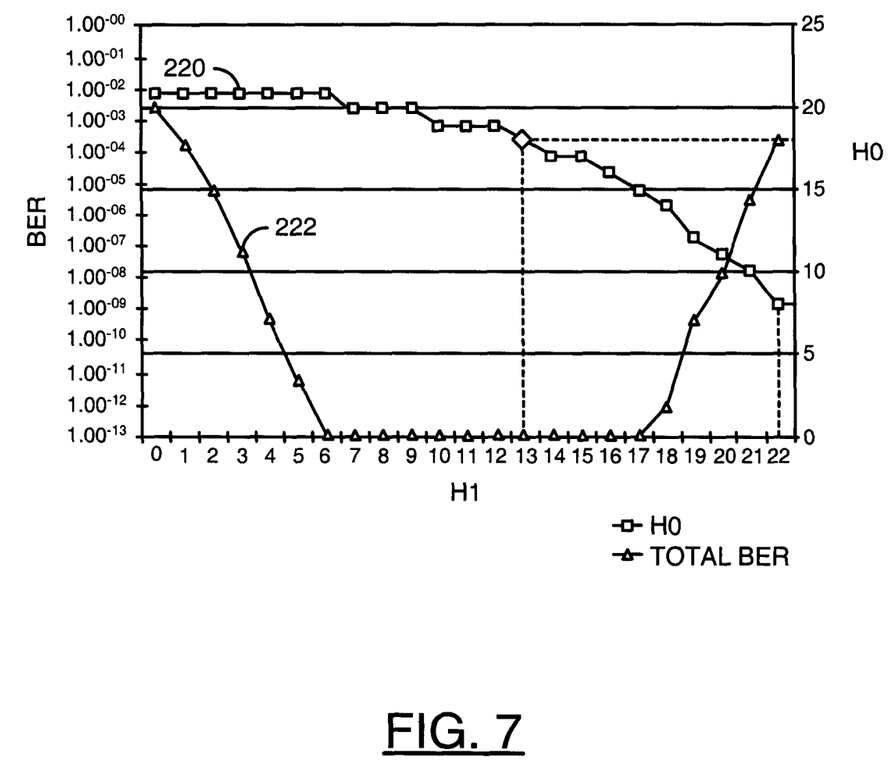
FIG. 7 is a diagram of experimental curves illustrating a soft-increase corner.

Referring to FIG. 7, a diagram of experimental curves illustrating a soft-increase corner is shown. The curves 220 and 222 were generally recorded from a graphical user-interface of a test chip. FIG. 7 generally shows the curve 220 of $h_0$ versus $h_1[x]$ (e.g., x-axis) and versus a Bit Error Ratio (BER) (e.g., left y-axis) of the receiver 100. The curve 222 may illustrate a BER versus $h_1[x]$.

In the example, the index of the DFE $H_1$ tap weight may be initially adapted by the sign-sign LMS technique (e.g., step 202) to an index value of 22 (approximately 88 millivolts (mV)). The corresponding index value $h_0$ may be 8 (approximately 84 mV) along the right (H0) y-axis. With the $H_1$ tap re-adaptation of FIG. 6, the $H_1$ tap weight may be adjusted downward causing the value $h_0$ to increase (e.g., the loop around steps 206 and 208). When the $h_1$ tap is decreased from the index value 15 to 14, the value $h_0$ remains unchanged at 17 (e.g., the NO branch of step 208). Therefore, $h_0[1]=17$ at $h_1[1]=14$ (e.g., step 210). The next four values of $h_0$ may be recorded for the next four steps of the $H_1$ tap weight (e.g., the rest of step 210). A soft-increase corner may be detected (e.g., step 212) because the change from $h_0[1]$ to $h_0[5]$ may be within the threshold of 2 (e.g., $19-17 \leq 2$). The median value of the five values of $h_0$ (e.g., 18 which is approximately 114 mV) may correspond to an $h_1$ index of 13 (e.g., approximately 52 mV). Consequently, the BER of the receiver may be improved from $10^{-9}$ at $h_1=22$ without re-adaptation to better than $10^{-13}$ at $h_1=13$ with re-adaptation.

Figure 8:
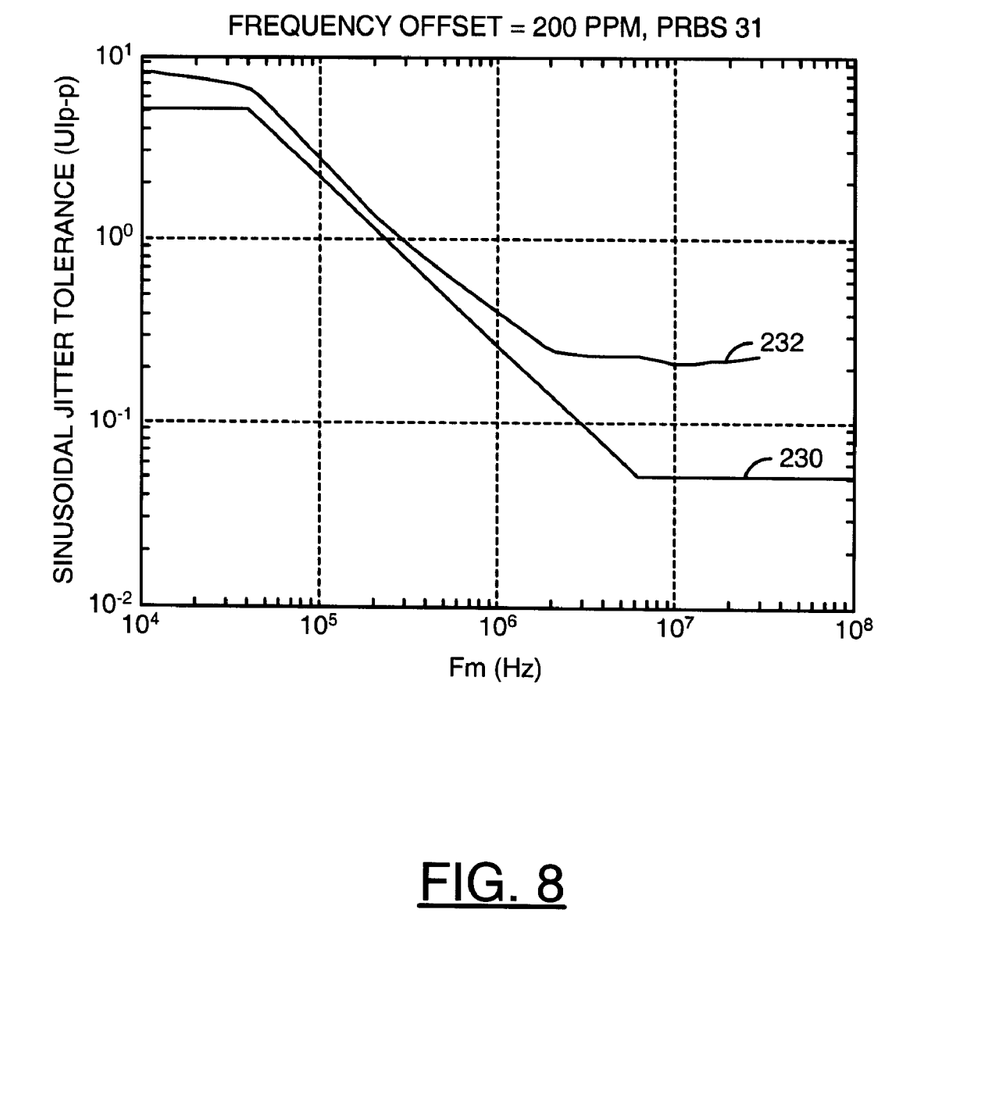
FIG. 8 is a diagram of example test results of a receiver sinusoidal jitter tolerance with the re-adaptation.

Referring to FIG. 8, a diagram of example test results of a receiver sinusoidal jitter tolerance with the $h_1$ tap re-adaptation in a Small Form-factor Pluggable (SFP+) 10 gigabit Ethernet test is shown. Without the $H_1$ tap re-adaptation, the receiver response may fail to meet the Sinusoidal Jitter (SJ) Mask 230. With the $H_1$ tap re-adaptation to center the sampling point of the Mueller-Muller baud-rate CDR, the receiver response 232 may exceed the SJ mask 230 with a sufficient margin.

The functions performed by the diagrams of FIGS. 3-6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. An apparatus comprising:
   a first circuit configured to (i) generate an equalizer parameter in response to an input signal, said equalizer parameter causing a cancellation of post-cursor inter-symbol interference from a plurality of symbols in said input signal and (ii) generate an output signal in response to both said input signal and said equalizer parameter; and
   a second circuit configured to (i) generate a target parameter signal in response to said input signal, said target parameter signal representing a mean value of a plurality of sample points of said symbols and (ii) generate a control signal in response to said target parameter signal, said control signal causing a reduction of said equalizer parameter, said reduction causing a decrease in said cancellation of said post-cursor inter-symbol interference from said symbols, wherein (A) said apparatus does not cancel pre-cursor inter-symbol interference, (B) said second circuit is further configured to measure a rate of change in said target parameter signal as said equalizer parameter changes, said second circuit is further configured to determine a median value of said target parameter signal while said rate of change in said target parameter is within a threshold, and (C) said output signal is generated in response to said median value.

2. The apparatus according to claim 1, wherein said second circuit comprises one of (i) a Mueller-Muller baud-rate clock and data recovery circuit and (ii) a Minimum Mean-Squared -Error baud-rate clock and data recovery circuit.

3. The apparatus according to claim 1, wherein said first circuit comprises an adaptive decision feedback equalizer configured to adjust said equalizer parameter in response to said control signal.

4. The apparatus according to claim 3, wherein (i) said adaptive decision feedback equalizer is further configured to generate a feedback signal in response to said control signal and (ii) said first circuit is further configured to generate an intermediate signal by subtracting said feedback signal from said input signal.

5. The apparatus according to claim 4, wherein (i) said first circuit further comprises a slicer configured to generate said output signal in response to said intermediate signal and (ii) said reduction of said equalizer value causes said sampling points to move toward a center of an eye at an input of said slicer.

6. The apparatus according to claim 1, wherein said first circuit is further configured to generate an error signal in response to all of said input signal, said output signal and said target parameter signal.

7. The apparatus according to claim 6, wherein said second circuit is further configured to generate said target parameter signal in response to said error signal.

8. The apparatus according to claim 1, wherein said second circuit is further configured to generate said control signal in response to said equalization parameter.

9. A method of symbol recovery in a receiver, comprising the steps of:
   (A) generating a target parameter signal in response to an input signal, said target parameter signal representing a mean value of a plurality of sample points of a plurality of symbols in said input signal;
   (B) generating an equalizer parameter in response to said input signal, said equalizer parameter causing a cancellation of post-cursor inter-symbol interference from said symbols;
   (C) generating a control signal in response to said target parameter signal, said control signal causing a reduction of said equalizer parameter, said reduction causing a decrease in said cancellation of said post-cursor inter-symbol interference from said symbols,
   (D) generating an output signal in response to both said input signal and said equalizer parameter, wherein said receiver does not cancel pre-cursor inter-symbol interference;
   (E) measuring a rate of change of said target parameter signal as said equalizer parameter changes; and
   (F) determining a median value of said target parameter signal while said rate of change is within a threshold, wherein said output signal is generated in response to said median value.

10. The method according to claim 9, wherein said threshold is an increase of at most two in said target parameter signal over five decrements of said equalizer parameter.

11. The method according to claim 9, further comprising the steps of:
- generating a first target value of said target parameter signal based on a first equalizer value of said equalizer parameter; and
- generating a second target value of said target parameter signal based on a second value of said equalizer parameter by changing said first value.

12. The method according to claim 11, further comprising the steps of:
- comparing said first target value with said second target value; and
- generating a plurality of subsequent target values of said target parameter signal based on a respective plurality of subsequent equalizer values of said equalizer parameter in response to said first target value matching said second target value.

13. The method according to claim 12, further comprising the steps of:
- measuring a spread of said subsequent target values; and
- resuming said reduction of said equalizer parameter in response to said spread exceeding a threshold.

14. The method according to claim 13, further comprising the step of:
- determining a middle value of said subsequent target values in response to said spread not exceeding said threshold, wherein said output signal is generated in response to said middle value.

15. The method according to claim 14, wherein said middle value results in a pre-cursor sample of said input signal matching a respective post-cursor sample of said input signal, wherein said pre-cursor sample is measured one unit interval before a particular one of said sample points and said post-cursor sample is measured said one unit interval after said particular sample point.

16. An apparatus comprising:
- means for (i) generating an equalizer parameter in response to an input signal, said equalizer parameter causing a cancellation of post-cursor inter-symbol interference from a plurality of symbols in said input signal and (ii) generating an output signal in response to both said input signal and said equalizer parameter; and
- means for (A) generating a target parameter signal in response to said input signal, said target parameter signal representing a mean value of a plurality of sample points of said symbols and (C) generating a control signal in response to said target parameter signal, said control signal causing a reduction of said equalizer parameter, said reduction causing a decrease in said cancellation of said post-cursor inter-symbol interference from said symbols, wherein (A) said apparatus does not cancel pre-cursor inter-symbol interference, (B) said apparatus is further configured to measure a rate of change in said target parameter signal as said equalizer parameter changes, said second circuit is further configured to determine a median value of said target parameter signal while said rate of change in said target parameter is within a threshold, and (C) said output signal is generated in response to said median value.

* * * * *